United States Patent [19]

Pasko

[11] 4,215,763
[45] Aug. 5, 1980

[54] RESONANT SOUND ATTENUATOR FOR TRANSFORMERS

[75] Inventor: Walter J. Pasko, Lee, Mass.

[73] Assignee: General Electric Company

[21] Appl. No.: 935,343

[22] Filed: Aug. 21, 1978

[51] Int. Cl.³ .............................................. H02K 5/24
[52] U.S. Cl. ................................. 181/202; 181/296
[58] Field of Search ............... 181/200, 202, 203, 204, 181/206, 207, 208, 284–294, 175, 198, 296; 340/80; 52/144, 145

[56] References Cited

U.S. PATENT DOCUMENTS

| 3,077,946 | 2/1963 | Wilkins | 181/202 |
| 3,160,549 | 12/1964 | Caldwell et al. | 181/207 |
| 3,926,265 | 12/1975 | Bouyoucos | 181/207 |

Primary Examiner—L. T. Hix
Assistant Examiner—Benjamin R. Fuller
Attorney, Agent, or Firm—Francis X. Doyle; Richard A. Menelly

[57] ABSTRACT

A sound attenuator for transformers comprises a rigid plate fixedly attached to a resilient mass. The sound attenuator is attached to the transformer outer wall in the vicinity of highest sound production. The characteristics of the metal plate and the resilient mass are chosen to produce acoustical radiation out of phase with the noise emitted at the transformer wall surface.

3 Claims, 6 Drawing Figures

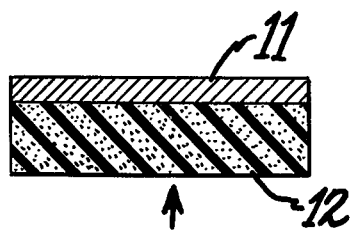
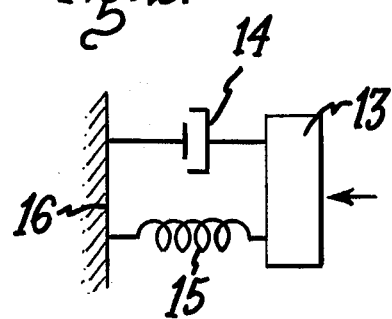
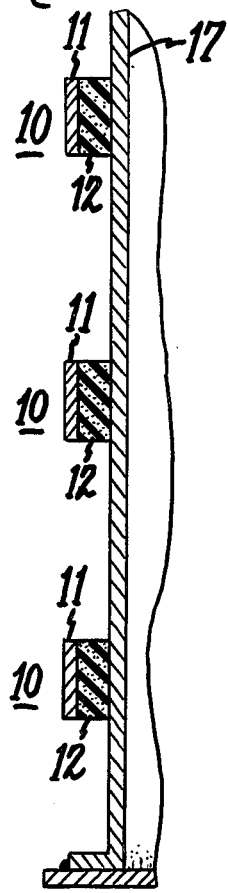
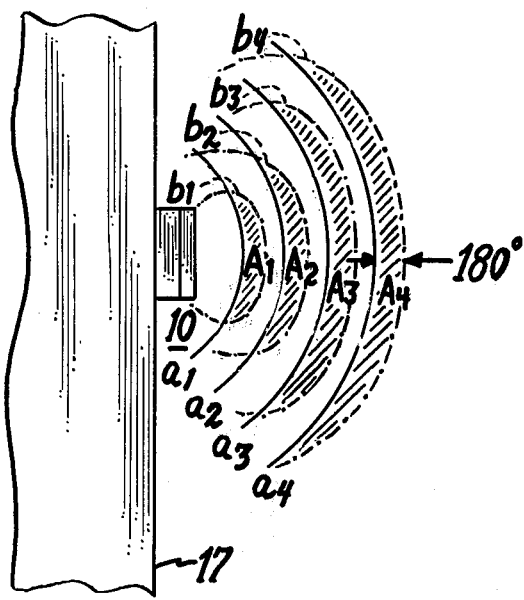

RESONANT SOUND ATTENUATOR FOR TRANSFORMERS

BACKGROUND OF THE INVENTION

Large power type transformers are known to be generators of noise caused by magnetostrictive effects in the core which cause the transformer casing to vibrate. Since transformers are finding more application in residential and industrial areas the transformer noise generated can become a nuisance to persons living and working in the area.

U.S. Pat. No. 3,077,946 discloses a method of suppressing transformer noise by surrounding the transformer tank with an energy absorbing material. It has been discovered that certain regions of the transformer tank produce the the largest percentage of the noise generated by the transformer. It is believed to be more economical and efficient to provide damping facility only to those regions of the transformer tank wall that actually produce sound. U.S. Pat. No. 3,876,034 discloses a sound proofing panel adapted to be applied against a noisy metal surface for attenuating the noise. The soundproof panel comprises a sheet of lead coated with a flexible and elastic material and is applied directly to the noise generating surface. The sound absorption is believed to result by the action of the panel as an inefficient secondary source of sound.

The purpose of this invention is to provide efficient and economic sound reduction to power transformers by the selective application of a sound absorbing device to the regions of the transformer casing which generate the most noise.

SUMMARY OF THE INVENTION

The invention comprises the combination of a rigid metal plate and a resilient substance wherein the natural frequency of the resultant combination provides sound waves 180 degrees out of phase with a vibrating transformer casing. The sound attenuator reduces the noise generated at the transformer surface by providing accoustic waves 180 degrees out of phase with the vibrating transformer wall for destructive cancellation of the sound waves produced at the wall surface.

BRIEF DESCRIPTION OF THE DRAWINGS

FIG. 1 is a side view of the sound attenuator of the invention;

FIG. 2 is a schematic representation of a mechanical analog for the sound attenuator for FIG. 1;

FIG. 3 is a side sectional view of a plurality of the sound attenuators attached to a transformer wall;

FIG. 6 is a side view of one of the sound attenuators of the invention attached to a transformer wall including a graphic representation of the wave trains emanating from both the transformer wall and the sound attenuator.

DESCRIPTION OF THE PREFERRED EMBODIMENT

Figure 4:
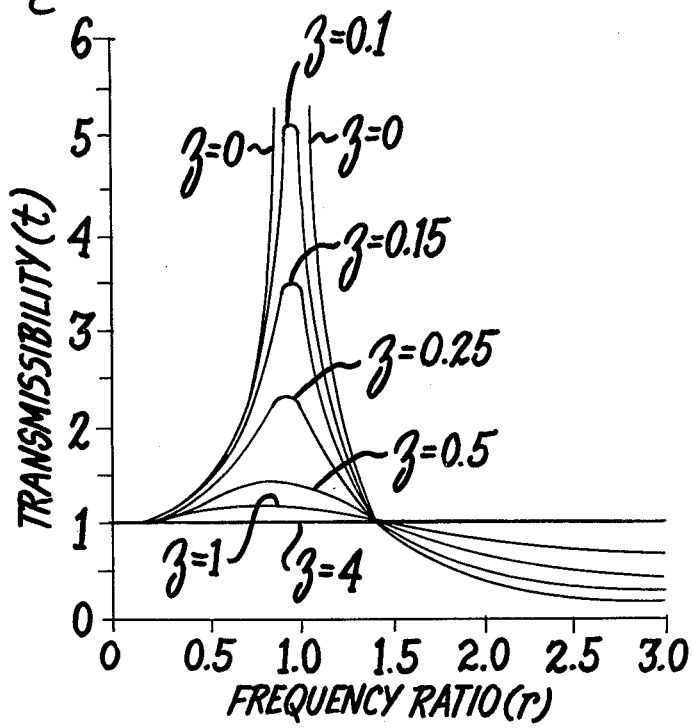
FIG. 4 is a graphic representation of the relationship between vibration transmissibility and frequency ratio for contours of damping ratios.

FIG. 1 shows the sound attenuator 10 consisting of a rigid plate 11 fixedly attached to a resilient mass 12. The rigid plate 11 can comprise a metal plate such as the type of steel plate used in fabricating transformer casings or can consist of a non metallic substance such as slate or cement. The resilient mass 12 can comprise a polymer or resin type material that has a high degree resiliency. Substances which can comprise the resilient mass are styrene and urethane foams and silicone resins. One efficient combination comprises a steel plate cemented to a porous polyurethane pad. The purpose of the resilient mass is to allow the plate to vibrate out of phase with the driving source.

FIG. 2 shows the mechanical analog of the sound attenuator wherein a solid mass 13 is attached to a fixed surface 16 by means of a parallel combination of a dash pot 14 and spring 15. The mass 13 represents the characteristics of the rigid plate and the combination of the dash pot and spring represents the function of the resilient mass. Upon applying a driving force to the resilient mass at the surface as indicated by the directional arrow in FIG. 1 the resilient mass of first "gives" before transmitting the motion to the plate. By the time the plate moves the driving force has delivered a second force which again became time-retarded by the "give" of the resilient mass. Upon carefully selecting the spring constant of the resilient material relative to the mass of the rigid plate the plate is made to vibrate out of phase with the driving force. Because of the phase shift sound waves produced by the plate interfere destructively with the sound waves produced by the driving surface.

FIG. 3 shows a plurality of sound attenuators attached to transformer casing 17. The attenuators are positioned with the resilient body 12 proximate the casing and the rigid plate 11 remote from the casing. The attenuator is fixedly attached to the casing by means of a quick drying adhesive cement. The adhesive can be applied to the casing or to the resilient body. The attenuators are attached to the regions of the transformer casing that are actually vibrating and generating sound. This is because one of the important features of the inventive sound attenuator is that the sound attenuator is most effective at the highest source of transformer noise. Sound attenuators only have to be attached to the transformer wall at the actual noise sites and not over the entire transformer wall surface as with prior art devices. The transformer wall can be sensed for sound generation by means of an acoustic microphone or by scanning the transformer surface with an accelerometer. The acoustic microphone will accurately point to the regions of the transformer wall surface where sound generation is most intense. The accelerometer will sense the regions of greatest disturbance of the transformer wall during operation. When the sound is particularly intense a trained observer can listen to and approximate the regions of highest sound production and employ a directional stethoscope to pinpoint the regions of greatest sound. In some instances a trained observer can actually feel the points of highest vibration by means of a specially designed hand held probe. Once the regions of greatest vibration are accurately determined the sound attenuators are then fastened to the transformer tank by means of the fast drying adhesive. When the vibrating portion of the transformer wall is quite large in area it may be more advantageous to affix a large sound attenuator in the central region of noise disturbance rather than affixing a plurality of smaller attenuators. Knowing the surfaces which are contributing to the large noise disturbance the required area of metal plate can be accurately determined by standard accoustical calculations.

In order to determine the most efficient design for the materials selected for both the rigid plate and the resilient mass the following factors must be considered. K, which is a measurement of the spring constant for the resilient material selected must first be determined. M, which represents the mass of the rigid plate must be determined for the particular transfer wall area. C, which is defined as the damping coefficient, can be determined by the relationship $c = C/2\,(KM)^{\frac{1}{2}}$ where c, for purposes for this disclosure, defines the ratio of the damping coefficient C to the product of the spring constant K and the mass M.

Another parameter which is necessary for determining the proper plate size and resilient material for the sound attenuator of the invention is the natural frequency of the attenuator. The natural frequency, $\omega_m = (K/M)^{\frac{1}{2}}$, depends upon the ratio of the spring constant K to the mass M. As described earlier the spring constant K depends to a great degree upon the material selected for the resilient mass, and the mass M depends upon the material and size of the rigid plate. Another parameter which is employed in determining the most efficient sound attenuator design is the frequency ratio r. The frequency ratio is defined, for the purpose of this disclosure, as the ratio of the frequency of sound generated by the transformer tank $\omega$ to that of the natural frequency of the rigid plate $\omega_m$.

The transmissibility t of vibration as a function of the frequency ratio r is shown in FIG. 4 for various calculated values of the damping coefficient z. It is to be noted that for a unity frequency ratio and zero dampening ratio that the vibration transmissibility approaches infinity. For increasing damping ratios at the same unity frequency ratio the transmissibility decreases from a factor of 5 to 1 as the damping ratio increases from 0.1 to 4.0. FIG. 4 indicates therefore, that the motion of the sound attenuator for attenuating noise generated at the transformer surface is a very sensitive function of the choice of materials comprising the spring constant and mass factor used in determining the damping ratio z.

Figure 5:
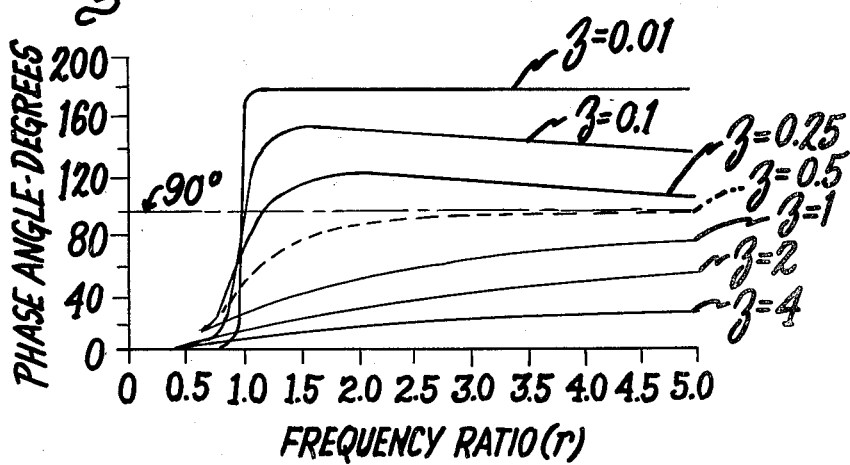
FIG. 5 is a graphic representation of the relationship between phase angle and frequency ratio for contours of damping ratios.

FIG. 5 shows the relationship between phase angle and frequency ratio for calculated values of the damping ratio z. It is found that for frequency ratios slightly in excess of unity the phase angle existing between the source frequency $\omega$ and the attenuator frequency $\omega_n$ decreases with increasing damping ratios. In order to obtain optimum attenuation by the method of the invention the natural frequency of the attenuator $\omega_n$ must be 180 degrees out of phase at the driving frequency $\omega$ of the vibrating transformer wall. With a frequency ratio of approximately 1.4 and a damping ratio of 0.01 the phase angle is approximately 180 degrees. Referring back to FIG. 4 a frequency ratio of 1.4 and a low value of damping ratio fixes the transmissibility of vibrations to approximately 1. This means that the tank wall and absorber both vibrate at the same amplitude but of opposite phase. For this condition maximum sound reduction occurs when 50 percent of the vibrating tank wall is covered by absorbers. Other combinations of frequency ratio and absorber coverage which produce the same displacement of air will be equally as effective in cancelling the sound of the tank wall. For purposes of this disclosure the transformer vibrational frequency can be considered equivalent to 120 hertz which is twice the AC line frequency into the transformer. In order to provide a frequency ratio of 1.4 the natural frequency of the plate $\omega_n$ should be approximately 86 hertz.

FIG. 6 contains one sound absorber 10 fixedly attached to a section of a transformer wall 17. The wave train of sound emanating from the transformer wall is indicated by a plurality of wave planes $a_1$ to $a_4$ and the wave train emanating from the surface of sound attenuator 10 is designated by a plurality of wave planes $b_1$–$b_4$. The principle of operation is as follows. The transformer originating waves are generated at a frequency of 120 hertz and the frequency of the sound attenuator waves are propagating at the same frequency but 180 degrees out of phase with the transformer waves so both trains of waves interfere destructively at the regions indicated at $A_1$–$A_4$. The energy contained within the transformer emanating waves is greater than the sound attenuator waves so that the attenuation will not be 100 percent complete. This is indicated by the decreasing size of overlapping areas $A_1$–$A_4$ as the waves propagate outwardly from the transformer wall and sound attenuator. The use of a sound attenuator to propagate waves 180 degrees out of phase with the transformer originating waves is more efficient than attempting to reduce the vibrations occurring on the transformer housing itself. It is to be noted that both the transformer originating waves and the waves emanating from the sound attenuator should both be multiples of a fundamental frequency for destructive interference to occur. Since both the transformer and attenuator waves are multiples of the same propagating frequency and are 180 degrees out of phase they both readily become cancelled by the phenomenon of acoustic interference.

The invention is especially useful when a complaint is received relative to a noisy transformer operating in the field. A technician can then determine the regions of greatest transformer casing vibration and can use a large sound attenuator or a plurality of smaller sound attenuators to lessen the generated sound by attaching the attenuators to the transformer casing at the regions of greatest vibrations. To facilitate the rapid attachment of the sound attenuator to the transformer casing the exposed surface of the resilient material can contain a layer of adhesive material protected by a paper backing. The paper could then be peeled away and the adhesive coated resilient mass applied to the transformer casing.

In some situations it may be necessary to increase the mass of the rigid plate on a sound attenuator already attached to a vibrating transformer wall. This can be done in the field by attaching a plurality of rigid plates one on top of the other and either applying an adhesive layer intermediate the plates or providing a plurality of rigid plates having a paper protective adhesive layer. The technician can observe the decreasing effects of the emanating sound as he continuously applies increasing layers of rigid plates until the desired degree in attenuation is realized.

Although the sound attenuator of the invention is described for use with power transformers this is by way of example only. The sound attenuator of the invention finds application with any type of transformer where generated noise is a problem.

I claim:

1. A method for attenuating noise from a vibrating transformer casing comprising the steps of:
   determining the regions of the transformer casing that are in vibration;

attaching a plurality of metal plate-capped resin bodies to the regions of the transformer casing that are in vibration; and adjusting the mass of the metal plates to cause the metal plates to vibrate 180 degrees out of phase with the transformer casing and to generate acoustic energy in proportion to said vibration for destructive cancellation of sound waves produced by said vibrating casing.

2. The method of claim 1 wherein the step of adjusting the mass of the metal plate comprises fixedly adding a plurality of additional plates to the metal plate.

3. The method of claim 2 wherein the metal plate comprises steel.